(No Model.)
S. M. J. HOUSE.
RAILWAY RAIL BRAKE.
No. 501,010. Patented July 4, 1893.
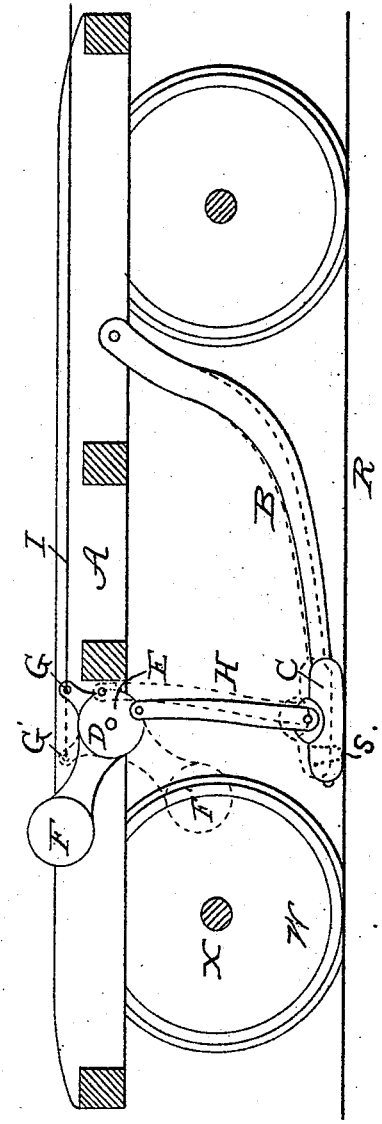
WITNESSES.
Frank M. Burnham
Edwin Greer
INVENTOR
Samuel M. J. House,
BY
Saml. J. Wallace,
ATTORNEY.

UNITED STATES PATENT OFFICE.

SAMUEL M. J. HOUSE, OF HILLSBOROUGH, VIRGINIA.

RAILWAY-RAIL BRAKE.

SPECIFICATION forming part of Letters Patent No. 501,010, dated July 4, 1893.

Application filed January 31, 1893. Serial No. 460,356. (No model.)

*To all whom it may concern:*

Be it known that I, SAMUEL M. J. HOUSE, a citizen of the United States, residing at Hillsborough, in the county of Loudoun and State of Virginia, have invented certain new and useful Improvements in Railway-Rail Brakes; and I do hereby declare the following to be a full, clear, and exact description of the invention, such as will enable others skilled in the art to which it appertains to make and use the same.

This invention consists in an improved system of apparatus for applying railway brakes to the rails to check or stop trains, and in various details.

The invention is made and used substantially as set forth hereinafter, and as shown in the accompanying drawing, in which the figure in a sectional view illustrates a car truck with the invention applied thereto.

A wheel truck of any suitable style may be used, having a frame A and wheels, W, with axles X. The beam B is pivoted or attached securely to the frame A, so as to move, to raise or lower the brake shoe C, held by its free end. This beam may be straight, or bent of such form as to fit into its position among the other necessary parts, including springs, not shown. The brake shoe is made to be replaceable when worn. The back end of the beam may be forked, not shown, the branches fitting lengthwise beams in frame A, on each side of the wheel, for steadiness. A shaft D is securely held crosswise of the truck frame A. This shaft bears on its ends wheels E, over the rails, with crank pins, which are connected with the beams or bars B by bars H and pivots, arranged so that the beams and brake shoes will be raised from or pushed down onto the rails R for use, as the shaft D and wheels E are turned one way or the other therefor by the means for operation. The shaft D bears, intermediately, a weighted projection F, to counterbalance and lift the beam and brake shoe when the brake rod or chain I, is released; and a projection G, for attaching the brake rod or chain I, so arranged as to enable the shaft to be turned to push down the brake shoes. The brake shoes are provided with holes S, of hopper shape into which pumice stone or other grit may be placed to wear on the track and enable the shoes to act on the rails.

The dotted lines show the motion of the parts in releasing the brake from use.

I claim—

1. A railway rail brake provided with means for lifting and for pushing it down onto the track, in use, and with a cavity or means for feeding grit onto the rail to increase the adhesion of the brake shoe in use.

2. A railway rail brake shoe mounted on a bar pivoted at one end, in combination with a wheel connected therewith by a bar pivoted to each so as to lift or push down the brake as the wheel is turned, and a brake rod arranged to turn the wheel.

3. A railway rail brake shoe mounted on a bar held at one end by a pivot, in combination with a wheel connected therewith by a bar held to each by a pivot, so as to lift or push the brake shoe to the rail as the wheel turns, and a weight arranged to counterbalance and lift the bar and shoe when released.

4. A railway rail brake shoe mounted on a bar held by a pivot at one end, in combination with a cross shaft connected therewith by a pivoted bar and a crank to lift or push down the brake as the shaft is turned, a counterbalance weight, and a crank connecting with a brake rod or chain.

5. The pivoted bar B bearing brake shoe C, connected by bar H, with crank wheel E, and a counterbalance weight F, all arranged for use as set forth.

In testimony whereof I do affix my signature in presence of two witnesses.

SAMUEL M. J. HOUSE.

Witnesses:
SAML. J. WALLACE,
W. A. LOW.